United States Patent
Ajima et al.

(10) Patent No.: US 9,819,299 B2
(45) Date of Patent: Nov. 14, 2017

(54) INVERTER DEVICE AND ELECTRIC VEHICLE

(71) Applicant: Hitachi Automotive Systems, Ltd., Hitachinaka-shi, Ibaraki (JP)

(72) Inventors: Toshiyuki Ajima, Tokyo (JP); Kimihisa Furukawa, Tokyo (JP); Kohei Myoen, Hitachinaka (JP); Hiroyuki Yamada, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/902,352

(22) PCT Filed: May 21, 2014

(86) PCT No.: PCT/JP2014/063405
§ 371 (c)(1),
(2) Date: Dec. 31, 2015

(87) PCT Pub. No.: WO2015/004994
PCT Pub. Date: Jan. 15, 2015

(65) Prior Publication Data
US 2016/0211790 A1 Jul. 21, 2016

(30) Foreign Application Priority Data
Jul. 9, 2013 (JP) .................... 2013-143787

(51) Int. Cl.
*G05B 11/28* (2006.01)
*H02P 27/08* (2006.01)
(Continued)

(52) U.S. Cl.
CPC .............. *H02P 27/08* (2013.01); *B60L 11/14* (2013.01); *B60L 11/1803* (2013.01);
(Continued)

(58) Field of Classification Search
CPC . G05B 11/28; H02P 1/46; H02P 27/04; H02P 21/00; H02P 27/06
(Continued)

(56) References Cited

U.S. PATENT DOCUMENTS 6,404,655 B1 * 6/2002 Welches .............. H02M 7/4807
363/17
7,119,530 B2 * 10/2006 Mir ....................... G01R 31/343
318/801
(Continued)

FOREIGN PATENT DOCUMENTS

EP       0 808 016 A1    11/1997
EP       2 159 909 A1     3/2010
(Continued)

OTHER PUBLICATIONS

International Search Report (PCT/ISA/210) issued in PCT Application No. PCT/JP2014/063405 dated Jul. 29, 2014 with English-language translation (four (4) pages).
(Continued)

Primary Examiner — Antony M Paul
(74) Attorney, Agent, or Firm — Crowell & Moring LLP

(57) ABSTRACT

Provided are an inverter device deterring PWM voltage error even if high inverter output frequencies are used for overmodulation driving and an electric vehicle equipped with the inverter device. In an angular section where the output voltage from an inverter device is linearly approximated with the zero cross point as the center thereof, a PWM generator in the inverter device changes either the time interval between the centers of PWM ON pulses or the time interval between the centers of PWM OFF pulses depending on the inverter operation state. An electric vehicle is equipped with the inverter device, which drives a motor.

6 Claims, 7 Drawing Sheets

(51) Int. Cl.
| | |
|---|---|
| *B60L 11/14* | (2006.01) |
| *B60L 11/18* | (2006.01) |
| *B60L 15/08* | (2006.01) |
| *B60L 15/00* | (2006.01) |
| *B62D 5/04* | (2006.01) |
| *H02M 7/5395* | (2006.01) |
| *H02M 7/48* | (2007.01) |

(52) U.S. Cl.
CPC ......... *B60L 11/1868* (2013.01); *B60L 15/007* (2013.01); *B60L 15/08* (2013.01); *B62D 5/046* (2013.01); *B60L 2210/40* (2013.01); *B60L 2240/421* (2013.01); *B60L 2240/423* (2013.01); *B60L 2240/526* (2013.01); *B60L 2240/527* (2013.01); *H02M 7/5395* (2013.01); *H02M 2007/4803* (2013.01); *Y02T 10/644* (2013.01); *Y02T 10/645* (2013.01); *Y02T 10/70* (2013.01); *Y02T 10/7005* (2013.01); *Y02T 10/7066* (2013.01); *Y02T 10/7077* (2013.01); *Y02T 10/7241* (2013.01); *Y10S 903/904* (2013.01)

(58) Field of Classification Search
USPC .... 318/400.01, 400.02, 400.14, 400.15, 700, 318/701, 721, 799, 500, 801, 599, 811; 363/21.1, 40, 44, 95, 120, 175
See application file for complete search history.

(56) References Cited

U.S. PATENT DOCUMENTS

| | | | |
|---|---|---|---|
| 7,911,177 B2 * | 3/2011 | Ohtani | H02M 7/53875 |
| | | | 318/727 |
| 9,013,137 B2 * | 4/2015 | Aoki | H02P 6/18 |
| | | | 318/727 |
| 2011/0221382 A1 * | 9/2011 | Hayashi | B62D 5/046 |
| | | | 318/801 |

FOREIGN PATENT DOCUMENTS

| | | |
|---|---|---|
| JP | 4-4759 A | 1/1992 |
| JP | 9-308256 A | 11/1997 |
| JP | 2000-287479 A | 10/2000 |
| JP | 2003-309993 A | 10/2003 |
| JP | 2006-230079 A | 8/2006 |
| JP | 2007-143316 A | 6/2007 |
| JP | 2009-207261 A | 9/2009 |
| JP | 2011-160529 A | 8/2011 |

OTHER PUBLICATIONS

Extended European Search Report issued in counterpart European Application No. 14822715.0 dated Jul. 4, 2017 (8 pages).

Pinto et al., "A Neural Network Based Space Vector PWM Controller for Voltage-Fed Inverter Induction Motor Drive", Conference Record of the 1999 IEEE Industry Applications Conference, Oct. 3, 1999, pp. 2614-2622, vol. 4, XP010354986.

Chiang et al., "Comparison of Two Overmodulation Strategies in an Indirect Matrix Converter", IEEE Transactions on Industrial Electronics, Jan. 1, 2013, pp. 43-53, vol. 60, No. 1, XP055382403.

* cited by examiner

ZERO CROSS TIMING 1

ZERO CROSS TIMING 2

INVERTER DEVICE AND ELECTRIC VEHICLE

TECHNICAL FIELD

The present invention relates to an inverter device and an electric vehicle.

BACKGROUND ART

Regarding an inverter drive device for driving a motor by controlling PWM (pulse-width modulation), an asynchronous PWM method that controls PWM by making carrier frequency constant with respect to variable output frequency of an inverter is widely used. Accordingly, when the inverter output frequency becomes high, the number of PWM pulses reduces and output errors of the inverter increase. Further, output voltage errors increase in an overmodulation mode in which the inverter output voltage command is more than the maximum output level of the inverter (sinusoidal wave). Especially, the imbalanced state of positive side voltage integration (positive voltage) and negative side voltage integration (negative voltage) which are switched in a half cycle of AC output makes the motor control unstable. Thus, it is desired to adjust to make the positive voltage and the negative voltage of the inverter output become roughly equal by adjusting modulated wave near the zero crossing of the output voltage.

PTL 1 describes a technique to minimize output voltage error by setting a 50% duty cycle near the zero crossing of the inverter output voltage.

Further, PTL 2 describes a technique to drive the inverter within a range of a modulation factor that does not cause an inverter output error.

Further, PTL 3 describes a technique to change carrier frequency according to inverter output frequency so that the inverter output error becomes small.

CITATION LIST

Patent Literatures

PTL 1: JP 2006-230079 A
PTL 2: JP 2007-143316 A
PTL 3: JP 2003-309993 A

SUMMARY OF INVENTION

Technical Problem

In PTL 1, in an overmodulation mode, a PWM pulse is output and a middle level value with a 50% duty cycle of modulated wave is set in a transition section between a high level value with a 100% duty cycle and a low level value with a 0% duty cycle. Such a configuration prevents a condition that a pulse component is lost since discontinuity of intersections with PWM carrier which is generated when the inclination of the modulated wave is precipitous (see FIG. 7). However, there is a problem that the inverter output is reduced since it is set as a 50% duty cycle near the zero crossing of the inverter output voltage and the average voltage becomes 0V therebetween.

Further, in PTL 2, phase errors that are caused in a relation between a voltage command and PWM signals when the inclination of the modulated wave becomes precipitous near the zero crossing of the inverter output voltage are reduced by generating PWM pulses using the modulated wave of which a modulation factor is suppressed. However, there is a problem that the inverter output is reduced since the PWM pulses are generated while suppressing the modulation factor.

Further, in PTL 3, the inverter output voltage is equilibrated with a synchronous PWM that changes PWM carrier frequency according to output frequency of the inverter. However, there is a problem that the load of a control calculation unit of a microcomputer or the like is increased when carrier frequency is changed since it is also needed to adjust schedules of the current detection and the control cycle.

Solution to Problem (1) An inverter device according to the invention of Claim 1 includes: a PWM pulse generation unit configured to generate a PWM pulse for converting DC voltage into AC voltage based on a motor output request; and an inverter circuit configured to drive a motor by converting DC voltage into AC voltage using the PWM pulse generated by the PWM pulse generation unit, and the PWM pulse generation unit generates the PWM pulse by changing either a time interval between centers of ON pulses or a time interval between centers of OFF pulses of a plurality of PWM pulses, based on the motor output request, in an angular section where linear approximation is performed around a zero cross point of output voltage.

(2) An inverter device according to the invention of Claim 2 includes: a PWM pulse generation unit configured to generate a PWM pulse for converting DC voltage into AC voltage based on a motor output request; and an inverter circuit configured to drive a motor by converting DC voltage into AC voltage using the PWM pulse generated by the PWM pulse generation unit, and the PWM pulse generation unit generates the PWM pulse so that the time interval between the centers of ON pulses and the time interval between the centers of OFF pulses of a plurality of PWM pulses differ based on the motor output request, in an angular section where linear approximation is performed around a zero cross point of the output voltage.

(3) An electric vehicle according to the invention of Claim 8 includes: a PWM pulse generation unit configured to generate a PWM pulse for converting DC voltage into AC voltage according to a motor output request; an inverter circuit configured to drive a motor by converting DC voltage into AC voltage using the PWM pulse generated by the PWM pulse generation unit; and DC/DC converter configured to increase the DC voltage, and the PWM pulse generation unit generates the PWM pulse by changing either a time interval between centers of ON pulses or a time interval between centers of OFF pulses of a plurality of PWM pulses, based on output voltage of the DC/DC converter, in an angular section where linear approximation is performed around a zero cross point of the output voltage.

Advantageous Effects of Invention

According to the present invention, in an inverter device that uses an asynchronous PWM method, output voltage errors and phase errors in an inverter circuit can be reduced and a motor can be controlled up to high-speed rotation in a stable manner.

DESCRIPTION OF EMBODIMENTS

The present invention provides an inverter device for driving a semiconductor switch element by an asynchronous PWM control and the inverter device has high output power by shifting ON timing or OFF timing of PWM pulses so as to equilibrate positive side and negative side of output voltage by performing linear approximation of modulated wave near a zero crossing of inverter output voltage. Hereinafter, an embodiment of the present invention will be described with reference to the drawings.

Figure 1:
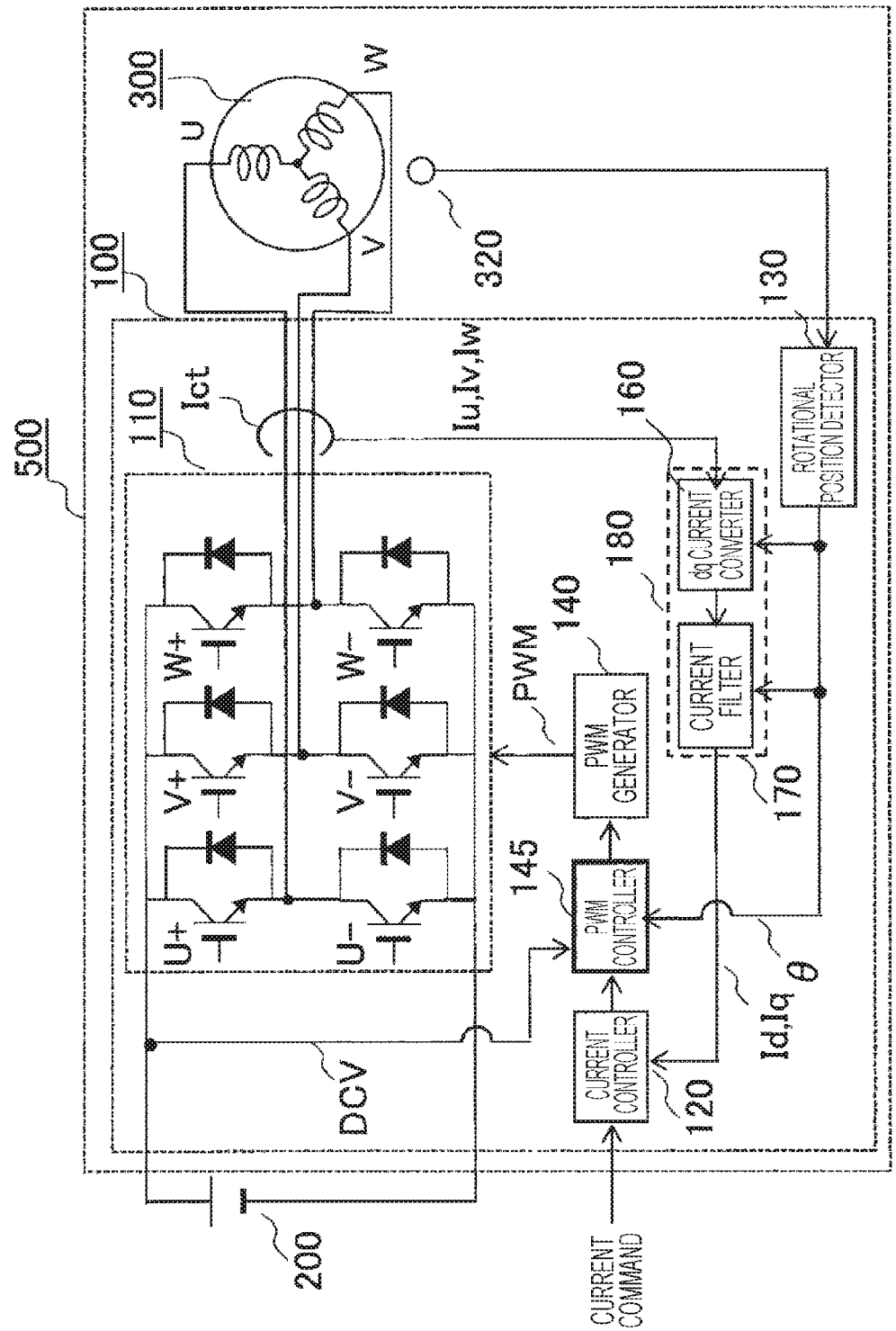
FIG. 1 is a block diagram illustrating a configuration of an inverter device according to the present invention.

FIG. 1 is a block diagram illustrating a configuration of a motor device 500 including an inverter device 100 according to the present invention. The motor device 500 includes a motor 300 and the inverter device 100. The motor device 500 is preferable to efficiently drive the motor 300 by detecting an attachment position error of a rotational position sensor of the motor 300 and corrects it when driving the motor.

The inverter device 100 includes a current detection unit 180, a current control unit 120, a PWM control unit 145, a PWM generator 140, an inverter circuit 110, and a rotational position detection unit 130. A battery 200 is a DC voltage source of the inverter device 100 and DC voltage DCV of the battery 200 is converted, by the inverter circuit 110 of the inverter device 100, into three-phase AC with variable voltage and variable frequency and applied to the motor 300.

The motor 300 is a synchronous motor that is rotary driven by supply of three-phase AC. To the motor 300, a rotational position sensor 320 is attached to control a phase of applied voltage of the three-phase AC according to the phase of inductive voltage of the motor 300, and the rotational position detection unit 130 calculates detected position θs based on an input signal of the rotational position sensor 320. Here, as the rotational position sensor, a resolver composed of an iron core and a winding wire is preferable; however, a GMR sensor or a sensor using a hall element may be used.

The inverter device 100 has a current control function for controlling an output of the motor 300. The current detection unit 160 includes a dq current converter 160 that detects three phase motor current with a current sensor Ict and outputs a dq current detection value (Id', Iq') which is dq converted based on a three-phase current detection value (Iu, Iv, Iw) and a rotational position θ, and a current filter 170 that smooths the dq current detection value (Id', Iq') and outputs a current detection value (Id, Iq). The current controller 120 outputs a voltage command (Vd*, Vq*) so that the current detection value (Id, Iq) and an input voltage command value (Id*, Iq*) correspond to each other.

The PWM controller 145 performs a two phase/three phase conversion of the voltage command (Vd*, Vq*) based on the rotational angle θ, generates a three phase voltage command (Vu*, Vv*, Vw*) in which third harmonic is overlapped, and performs a pulse-width modulation (PWM) by performing linear approximation of the modulated wave near the zero crossing. The output from, the PWM controller 145 is converted into a pulse signal in the PWM generator 140 and is output to the inverter circuit 110 as a drive signal PWM. A semiconductor switch element of the inverter circuit 110 is on/off controlled by the drive signal PWM and the output voltage of the inverter circuit 110 is adjusted.

Here, in the motor device 500, when controlling a rotational rate of the motor 300, a motor rotational rate or is calculated based on a time change of the rotational position θ, and a voltage command or a current command is created so as to correspond to a rate command from a higher-level controller. Further, when controlling a motor output torque, a current command (Id*, Iq*) is created by using a relational expression or a map of a motor current (Id, Iq) and a motor torque.

Next, with reference to FIG. 2, a waveform diagram illustrating a modulated wave according to an embodiment will be described.

FIG. 2(a) illustrates modulated signal waveforms and a carrier signal waveform, and illustrates a modulated signal which has a relatively low modulation factor (modulated wave 1), a maximum modulated wave which can be sinusoidally modulated (modulated wave 2), a modulated wave which starts as a sinusoidal modulation and then becomes in a overmodulation state that pulse is 100% continuous (saturation section) (modulated wave 3), a modulated wave that is in a square wave state that the inverter output becomes maximum (modulated wave 4), and a carrier signal that generates a PWM pulse as comparing with the size of the modulated wave signal. FIG. 2(b) illustrates a PWM pulse signal in a case of the modulated wave 1, and FIG. 2(c) illustrates a PWM pulse signal in a case of the modulated wave 3. The PWM pulse is continuously on in almost all sections of the electric angles 0 to 180. FIG. 2(d) illustrates a PWM pulse signal in a case of the modulated wave 4, and this PWM pulse signal is on in the all sections of the electric angles 0 to 180.

Each modulated wave is equivalent to a modulated wave H(θ) of one phase of the three phase voltage command (Vuc, Vvc, Vwc) and almost equal to U phase modulated wave Hu(θ) (=Vuc/(DCV/2)), if dead time is ignored. When effective value of the sinusoidal wave when the modulation factor=1 where the inverter output is not saturated is made to be 1, a fundamental element included in the modulated wave H(θ) to which a third harmonic is overlapped becomes 1.15 times (115%) (modulated wave 2). In other words, the inverter output is not saturated up to the voltage command of 1.15.

Figure 2:
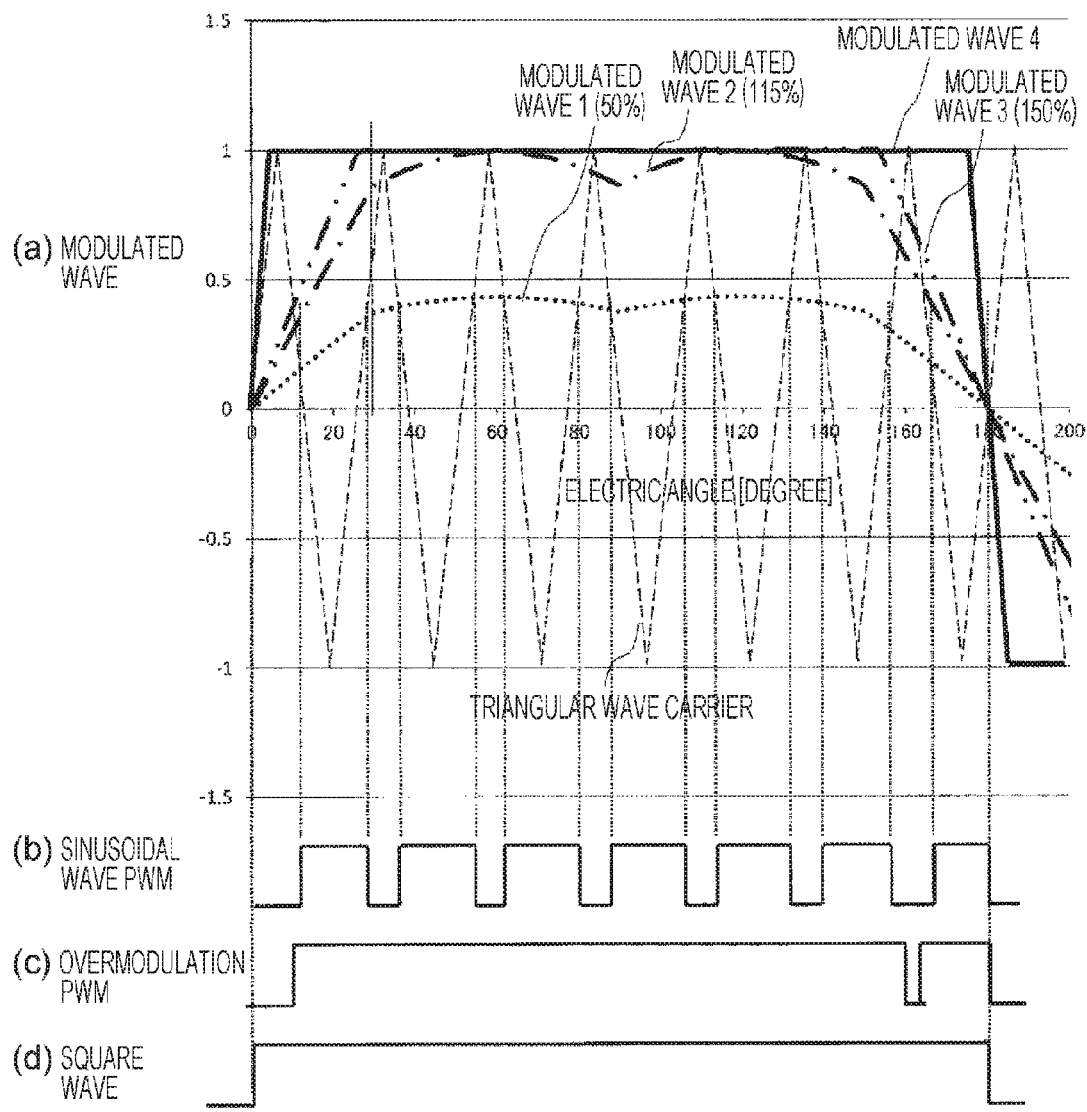
FIG. 2 is a waveform diagram illustrating a modulated wave according to an embodiment.

As illustrated in FIG. 2, the modulated wave H(θ) to which the third harmonic is overlapped can be linearly approximated at the zero cross point. According to the present embodiment, near the zero crossing of the modulated wave, PWM pulses are generated by a later described asynchronous PWM modulation and, in other sections, PWM pulses are generated by a conventionally used asynchronous PWM modulation. Here, it is preferable to perform linear approximation in an angular section within ±30 degrees of the electric angle around the zero crossing of the modulated wave.

Further, an inclination A of the modulated wave in a section near zero crossing where liner approximation can be performed is proportional to a modulation factor corresponding to a voltage command value and the modulated wave is proportional to an angular position θ. For example, where the angle near the zero crossing is denoted as θ' and θ' is assumed as −30≤θ'≤30, the modulated wave H(θ') near the zero crossing can be expressed as Equation (1).

$$H(\theta')=A-\theta' \quad (1)$$

In other words, since the modulated wave H(θ) near the zero crossing can be expressed using the inclination A of the modulated wave as a substitute for the modulation factor, an inverter output pulse near the zero crossing, that is, a PWM pulse can be determined based on the inclination A of the modulated wave. According to the present embodiment, as described later, a PWM pulse generation unit has a table in which the inclination A of the modulated wave and the PWM pulse are associated with each other and generates a PWM pulse by referring to the table based on the calculated inclination of the modulated wave.

Here, in the table, the inclination A of the modulated wave and ON timing and OFF timing of the PWM pulse are associated. Here, in a condition where |H(θ)|<|A−θ|, an inverter output pulse can be determined based on a value of the modulated wave H(θ).

Next, with reference to FIGS. 3(A) and 3(B), a waveform diagram that illustrates PWM near zero crossing according to an embodiment will be described.

Figure 3A:
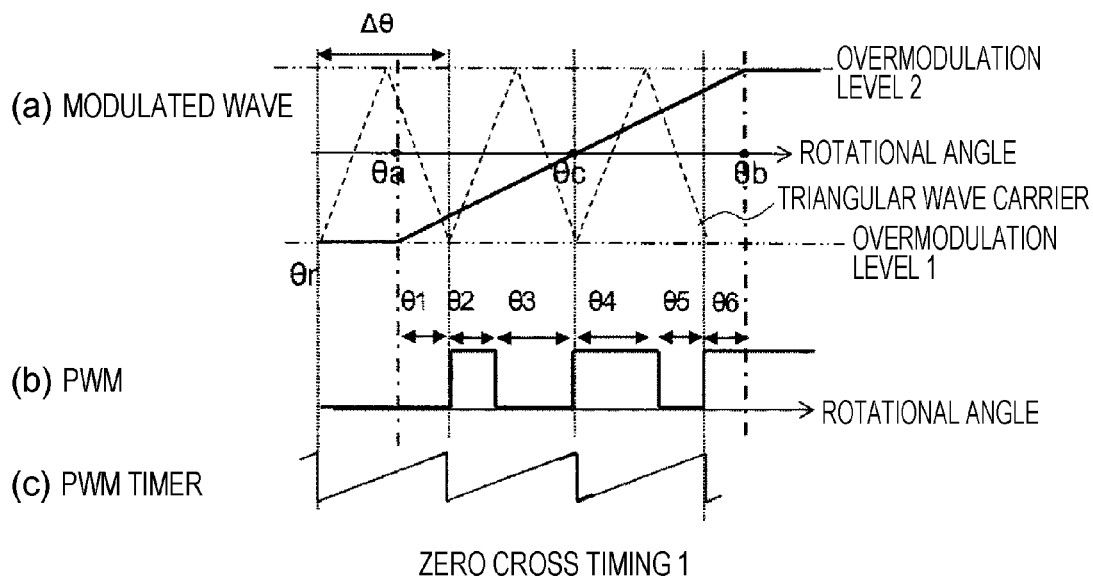
FIGS. 3A and 3B are waveform diagrams illustrating PWM near zero crossing according to an embodiment.

FIG. 3(A) illustrates a case that the PWM pulse becomes ON in a first half of the triangular wave carrier based on the phase relationship between the modulated wave and the triangular wave carrier, that is, at rising of the triangular wave carrier signals. The signal waveform of FIG. 3(A) is referred to as a zero crossing—timing 1 signal waveform. FIG. 3(B) illustrates a case that the PWM pulse becomes ON in a second half of the triangular wave carrier based on the phase relationship between the modulated wave and the triangular wave carrier, that is, at trailing of the triangular wave carrier signals. The signal waveform of FIG. 3(B) is referred to as a signal waveform of the zero crossing—timing 2.

Figure 3B:
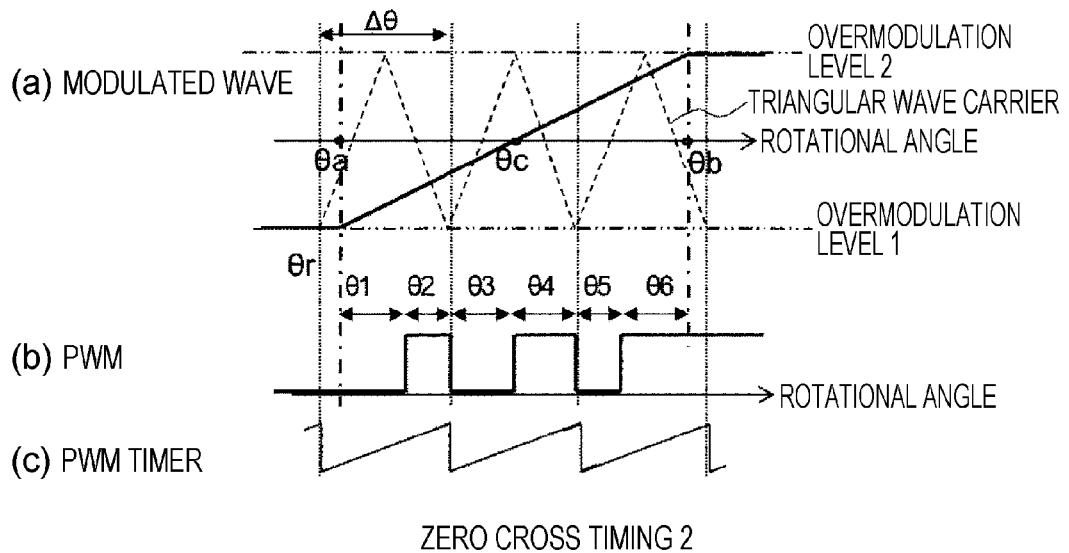

Both FIGS. 3(A) and 3(B) are examples of the motor rotating at a certain rate where an angular variation width Δθ when the motor rotates during a certain PWM carrier cycle is almost constant and this angular variation width Δθ is equivalent to the carrier cycle. Further, a case that two or three PWM pulses are generated in a section where the modulated wave is linearly approximated near the zero crossing will be described.

In FIGS. 3(A) and 3(B), the diagrams (a) illustrate a modulated wave and a triangular wave carrier signal, the diagrams (b) illustrate a PWM pulse to be output in one PWM cycle, and the diagrams (c) illustrate a PWM timer value when a PWM pulse is generated using a microcomputer, and in this embodiment, a PWM timer in a sawtooth waveform is illustrated.

The signal waveform of zero crossing—timing 1 in FIG. 3(A) illustrates, as described above, a case that a PWM pulse becomes ON in the rise section of the triangular wave carrier signal, that is, a case that the modulated wave reaches an overmodulation level 1 at an angular position θa where is Δθ/2 further or more from the timing of angular position θr. In the signal waveform of the zero crossing—timing 1, the PWM pulse is made high during the section θ2 at or after the timing of angular position θr+Δθ. After that low pulses are output until an angle θc where the modulated wave H(θ) becomes zero. Then, the PWM pulse is made high at a timing of the angle θc and low pulse of PWM pulse is output only in a section θ5 after the angle θc. After that the modulated wave reaches an overmodulation level 2 at a timing of an angle θb.

Conventionally, as disclosed in PTLs 1 to 3, to resolve an imbalanced state of the positive side voltage integration (positive voltage) and negative side voltage integration (negative voltage) which are switched in a half cycle of the AC output, a different generation method is used for PWM pulses near the zero crossing of the output voltage from that for PWM pulses in other sections.

In PTL 1, it is set to be a 50% duty cycle near the zero crossing of the inverter output voltage, and an output voltage error is minimized.

Further, in PTL 2, when the inclination of the modulated wave in the vicinity of zero crossing of the inverter output voltage is precipitous, a PWM pulse is generated using the modulated wave in which the modulation factor is controlled so that phase error is reduced. Thus, the conventional techniques of these two pieces of literature reduce inverter output.

In view of the above, according to an embodiment of the present invention, in an electric angle range in the vicinity of an electric angle of zero crossing of the modulated wave, for example in a range of ±30 degrees, the positive side output voltage in the section of −30 degrees and the negative side output voltage in the section of +30 degree are made to be equal to prevent the output in the electric angle section of ±30 degrees from reducing.

In FIGS. 3(A) and 3(B), when it is made as θ2=θ5, the strength of the negative voltage and positive voltage can be balanced focusing around the zero crossing of modulated wave. Further, near the zero crossing of the modulated wave, since a pulse edge can be generated by adjusting as θc−θa=θb−θc, phase errors of the inverter output can be reduced. Further, since the PWM pulse can be generated in an accurate size corresponding to the modulated wave, reduction of the inverter output can also be prevented.

Here, a PWM pulse width that the inverter device is to output will be described using a section from a rotational angle θc at the zero cross point of modulated wave to a rotational angle θb where the overmodulation level 2 is achieved. When the modulated wave is standardized from −1 (overmodulation level 1) to +1 (overmodulation level 2), the area of the modulated wave in the rotational angle θb where standardized value is 1 becomes a half compared to that of the rotational angle θc where standardized value is 0. On the other hand, when OnDuty that can be output in the section of standardized modulated wave −1 to +1 (rotational angles θa to θb) is assumed as 100%, OnDuty in the section of standardized modulated wave 0 to 1 (rotational angles θc to θb) is relevant to 50 to 100% (Δ50%). In other words, the section average OnDuty in the rotational angles θc to θb in FIG. 3(A) is 75% and θ4, θ5, and θ6 are determined so that it is made as OnDuty is 75% in 1.5 PWM pulses in the section of the rotational angles θc to θb. Since θ4 and θ6 are OnDuty, it is preferably set OffDuty where θ5 is 25%. Further, regarding the section of the rotational angles θa to θc, similarly, OffDuty is set for θ1 and θ3 and "OnDuty=25%" is set for θ2.

As described above, the PWM pulse generator 140 generates PWM pulses so that the values of integrated areas of an ON pulse and an OFF pulse of PWM pulses become equal, in the angular sections θa to θb where linear approximation is performed around the zero cross point θc of the output voltage.

The signal waveform in zero crossing—timing 2 in FIG. 3(B) is a case that the PWM pulse becomes ON in the section of a trailing edge of a triangular wave carrier signal as described above, and illustrates a case that modulated wave reaches the overmodulation level 1 at the angular position θa which is within Δθ/2 from the angular position θr. The signal waveform at zero crossing—timing 2 becomes equal to the overmodulation level 1 in the angular position θa. This makes a difference from FIG. 3(A). Thus, based on the phase relationship between the modulated wave and the triangular wave carrier, other than the point that the PWM pulse becomes high in the latter half of the triangular wave carrier, that is, in the rising slope side are the same as FIG. 3(A).

According to an embodiment of the present invention, since PWM pulses are generated so that the pulse width varies near the zero crossing of the modulated wave within the cycle of asynchronous PWM, a time interval between the centers of the ON pulses of the PWM pulse or a time interval between the centers of the OFF pulses are controlled to be different from each other. In other words, the PWM pulse generation unit generates PWM pulses so that the time interval between the centers of the ON pulses and the time interval between the centers of the OFF pulses of a plurality of PWM pulses differ according to the inverter circuit operation state, that is according to a motor output request, at an angular section where linear approximation is performed around the zero cross point of the output voltage.

Here, FIGS. 3(A) and 3(B) illustrate PWM pulses of one phase, while other two phases in a case of being in an overmodulation mode are in a condition of the overmodulation level 1 or overmodulation level 2.

Here, FIGS. 3(A) and 3(B) illustrate a case that a leading edge and a trailing edge of each PWM pulse are synchronized with the timing of the PWM carrier cycle. However, the leading edge and trailing edge of the PWM pulse do not have to be synchronized with the timing of the PWM carrier cycle and the waveforms of output voltage is preferably expressed as symmetrical waveforms on the basis of the angle θc. Further, a case that the motor rotates at a certain rate has been described; however, in a case that the motor is being accelerated or decelerated, the PWM pulse can be generated with a same logic by calculating Δθ considering the acceleration or deceleration.

Next, with reference to FIG. 4, a waveform diagram illustrating pulse generation according to an embodiment will be described.

Figure 4:
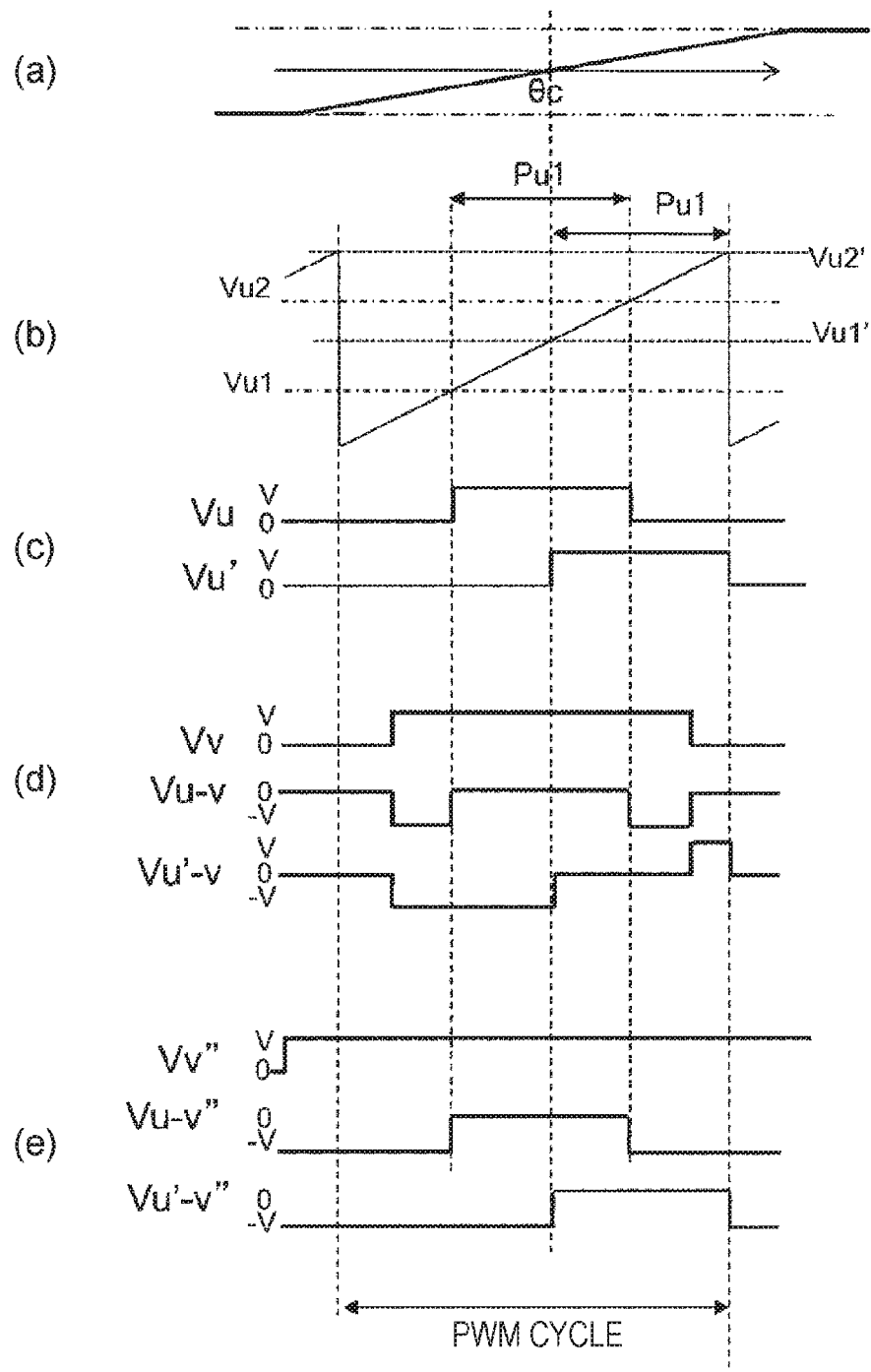
FIG. 4 is a waveform diagram illustrating pules generation according to an embodiment.

The diagram (a) of FIG. 4 illustrates a modulated wave signal, the diagram (b) illustrates operation of a timer counter of a sawtooth waveform in U phase, the diagram (c) illustrates PWM pulses in U phase, the diagram (d) illustrates PWM pulses when modulating a sinusoidal wave and a V phase PWM pulse corresponding to U-V line voltage, and the diagram (e) illustrates V phase PWM pulses in enable-modulating and a PWM pulse corresponding to the U-V line voltage.

In FIG. 4(b), when a PWM pulse is generated at the center of PWM carrier, timer comparison values Vu1 and Vu2 are set focusing on a timer median value so that a pulse width Pu1 is generated in the middle of the center of the timer cycle, and the inverter output pulse Vu of FIG. 4(c) is output. Voltage pulses applied to the motor becomes Vu-v of FIG. 4(d). When PWM pulses are output at the timing illustrated in FIGS. 3(A) and 3(B), that is, when the ON timing and OFF timing of the PWM pulses are determined so as to equalize the positive side output voltage and the negative side output voltage near the zero crossing, the inverter output pulse Vu' of FIG. 4(c) can be output by setting the timer compare value Vu1' and Vu2' so as to shift the timing of the pulse width Pu1 as it is. With this, the U phase PWM pulse becomes a pulse synchronized with the zero cross point θc of the modulated wave in FIG. 4(a) and the pulse that can be applied to the motor in a sinusoidal wave modulation becomes the PWM pulse illustrated as Vu'-v in FIG. 4(d). Thus, although a voltage error caused by the PWM pulse is included, in sinusoidal wave modulation, the number of PWM pulses is large and influence of a voltage error is small since the motor rotational rate (output frequency of the inverter) is low in general. Preferably, pulse shifting is stopped when the motor rotational rate is low.

In overmodulation, influence of a voltage error becomes large since inverter output frequency is high and the number of the PWM pulses is small in general. The reference Vv" shown in FIG. 4(e) is a V phase signal in overmodulation where Duty is almost 100% near the U phase zero crossing, and the Vu-v" when the U phase is not pulse shifted is not a PWM pulse which is synchronized with the zero crossing of the U phase modulated wave. Regarding the Vu'-v" when the U phase is pulse shifted, the U phase PWM pulse is output as it is and an inverter output synchronized with the zero crossing of the modulated wave can be obtained.

To generate a PWM pulse for converting DC voltage into AC voltage based on a motor output request, that is, based on an inverter operation state, the above described inverter device 100 includes a PWM pulse generation unit composed of the current controller 120, the PWM controller 145, and the PWM generator 140 and the inverter circuit 110 that converts DC voltage into AC voltage using the PWM pulse generated in the PWM pulse generation unit and drives the motor. The PWM pulse generation unit generates a PWM pulse by changing, based on the motor output request, either the time interval between the centers of ON pulses or the time interval between the centers of OFF pulses of a plurality of PWM pulses in an angular section in which linear approximation is performed around the zero cross point of the output voltage. The PWM pulse generation unit generates a PWM pulse so that the motor is driven at predetermined torque and predetermined rotational rate according to the motor output request.

According to the above described embodiment, desired PWM pulses can be generated by shifting the timer comparison values Vu1 and Vu2 according to the inverter operation state. The PWM pulse may be generated with other method.

According to an embodiment of the present invention, since the PWM pulse timing near the zero crossing of the modulated wave can be adjusted by shifting the pulses at any timing within the PWM carrier cycle, an inverter output with less influence of inverter output voltage (including phase) error can be obtained in an asynchronous PWM control. Further, this can help to suppress an increase of load of the microcomputer, compared to a synchronous PWM control.

It has been described that the PWM pulse generator 140 includes a table that associates modulated wave inclinations with PWM pulses and generates PWM pulses by using a calculated modulated wave inclination and referring to the table; however, PWM pulses may be generated based on the inclination A without using the table. Further, PWM pulses may be generated without the inclination A. Further, it is preferable that the PWM pulse generator 140 generates PWM pulses so that the values of integrated areas of ON pulse and OFF pulse of a plurality of PWM pulses become equal in the angular section in which linear approximation is performed around the zero cross point of output voltage.

Next, with reference to FIG. 5, a configuration of an electric power steering device in which a motor drive device described in an embodiment of the present invention is applied will be described.

Figure 5:
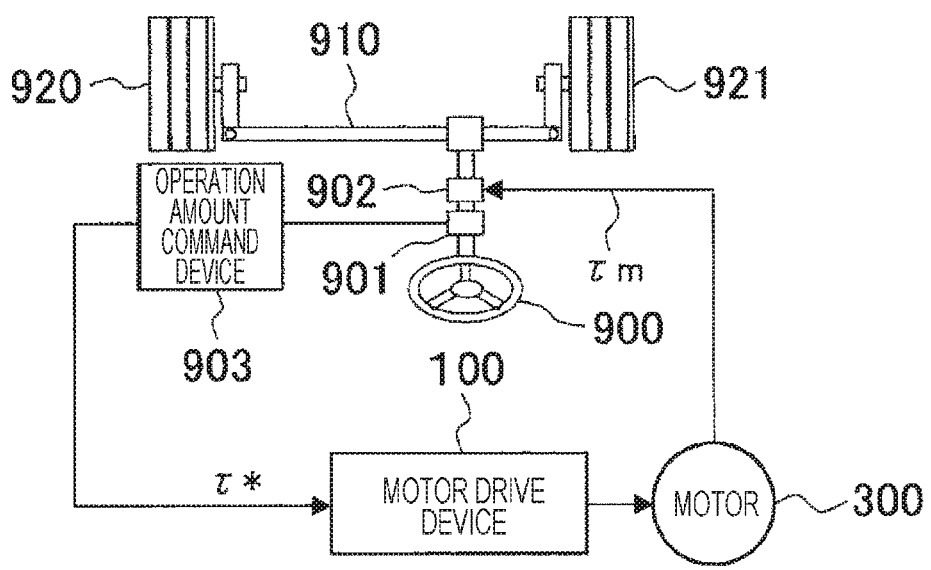
FIG. 5 is a configuration diagram of an electric power steering device in which the inverter device according to the present invention is applied.

FIG. 5 is a configuration diagram of the electric power steering device in which the motor drive device according to the embodiment of the present invention is applied.

As illustrated in FIG. 5, the electric actuator of the electric power steering is composed of a torque transmission mechanism 902, a motor 300, and an inverter device 100. The electric power steering device includes the electric actuator, a wheel (steering wheel) 900, a steering detection device 901 and an operation amount command device 903, and has a configuration that an operation force of the wheel 900 operated by a driver gets a torque assist using the electric actuator.

A torque command τ* of the electric actuator is created by the operation amount command device 903 as a torque command of steering assist of the wheel 900. Driver's steering force is reduced by an output of the electric actuator driven by the torque command τ*. The inverter device 100 receives the torque command τ* as an input command and controls motor current to follow the torque command value according to torque constant and a torque command τ* of the motor 300.

A motor output τM output from an output shaft directly coupled to a rotator of the motor 300 transmits torque to a rack 910 of the steering device via the torque transmission mechanism 902 using a deceleration mechanism such as a worm, wheels, a planetary gear and the like, or a hydraulic mechanism. The torque transmitted to the rack 910 causes that the steering-force (operation force) of the wheel 900 by the driver is reduced (assisted) by the power, and the steering angle of the wheels 920 and 921 is manipulated.

This amount of assist is determined as follows. That is, the steering angle or the steering torque is detected by the steering detection device 901 incorporated in a steering shaft, and the operation amount command device 903 calculates a torque command τ* based on the amounts of states such as vehicle speed or road state.

The inverter device 100 according to the embodiment of the present invention has an advantage that vibration and noise can be reduced by averaging the inverter output voltage even in a case of high-speed rotation.

Figure 6:
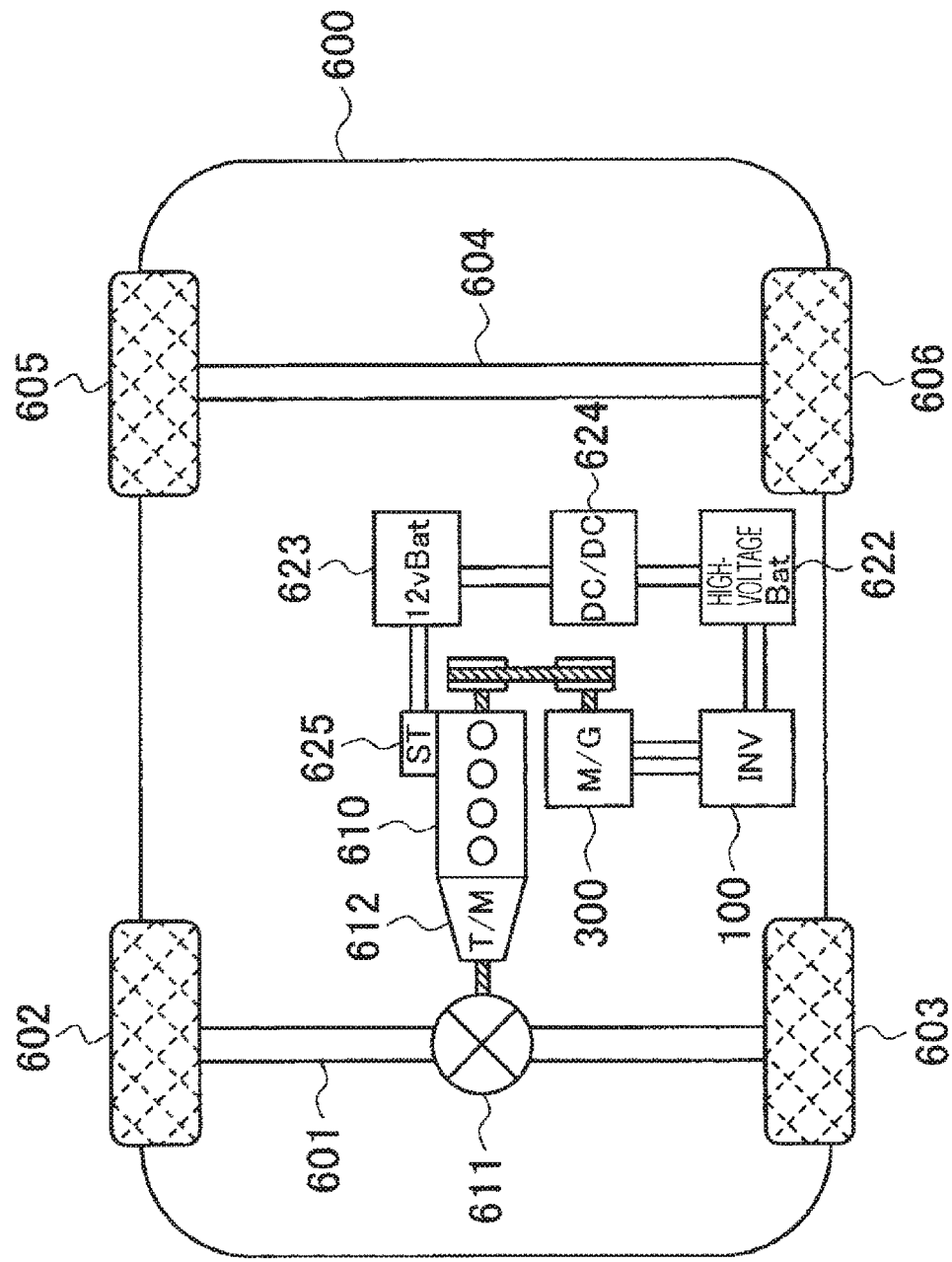
FIG. 6 is a configuration diagram of an electric vehicle in which the inverter device according to the present invention is applied.
Figure 7:
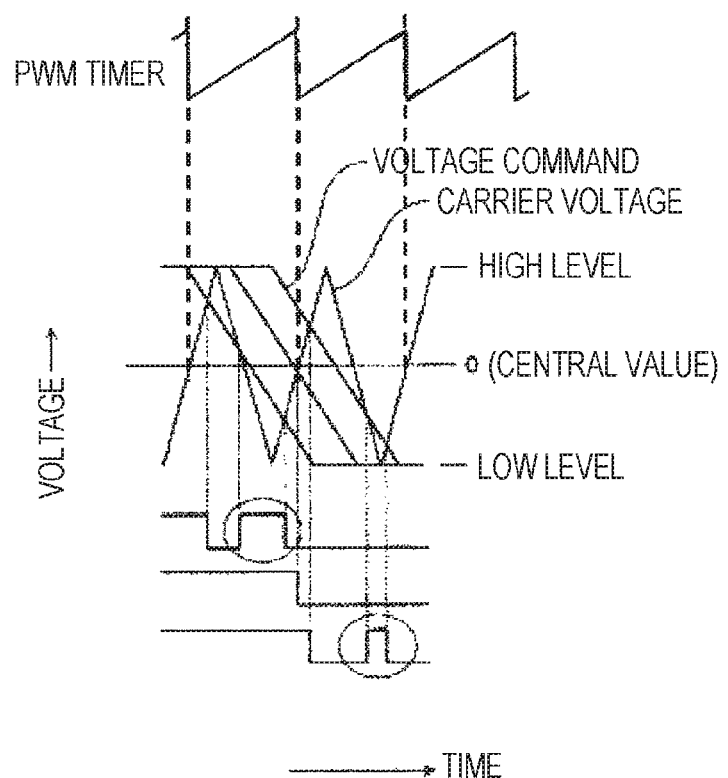
FIG. 7 is a waveform diagram illustrating a conventional neighborhood of a zero crossing.

FIG. 6 is a diagram illustrating an electric vehicle 600 in which the inverter device 100 according to the present invention is applied. The electric vehicle 600 includes power train in which the motor 300 is applied as a motor/generator.

In a front part of the electric vehicle 600, a front wheel axle 601 is rotatablly supported and, at both ends of the front wheel axle 601, front wheels 602 and 603 are provided. In a rear part of the electric vehicle 600, a rear wheel axle 604 is rot at ably supported and, at the both ends of the rear wheel axle 604, rear wheels 605 and 606 are provided.

At the middle of the front wheel axle 601, a differential gear 611 as a power distribution mechanism is provided and the rotation drive force transmitted from an engine 610 via a transmission 612 is distributed to the right and left parts of the front wheel axle 601. The engine 610 and the motor 300 are mechanically coupled to each other via a belt 630 that is provided across a provision of a crank shaft of the engine 610 and a pulley provided on a rotation shaft of the motor 300.

With this configuration, the rotation drive force of the motor 300 can be transmitted to the engine 610 and the rotation drive force of the engine 610 can be transmitted to the motor 300, respectively. In the motor 300, three-phase AC power controlled by the inverter device 100 is provided to a stator coil of the stator and this causes that the rotator rotates and rotation drive force corresponding to the three-phase AC power is generated.

That is, the motor 300 is controlled by the inverter device 100 and operates as an electric motor while operating as an electric generator that generates three-phase AC power by rotating the rotator as receiving the rotation drive force of the engine 610.

The inverter device 100 is a power conversion device for converting DC power supplied from a high-voltage battery 622 which is a nigh-voltage (42 V or 300 V) power supply into three-phase AC power and controls three-phase AC current to be flown through the stator coil of the motor 300 according to an operation command value and a magnetic pole position of the rotator.

The three-phase AC power generated by the motor 300 is converted into DC power by the inverter device 100 and charges the high-voltage battery 622. The high-voltage battery 622 is electrically connected to a low-voltage battery 623 via a DC/DC converter 624. The low-voltage battery 623 configures a low-voltage (14 v) power supply of the electric vehicle 600 and is used for a power supply of a starter 625 that initially starts (cold-starting) the engine 610, a radio, a light, or the like.

When the electric vehicle 600 is in a stop state such as waiting at a traffic light (idle stop mode), the engine 610 is stopped and, when, the engine 610 is restarted (hot-started) for driving again, the inverter device 100 drives the motor 300 to start the engine 610.

Here, in the idle stop mode, when the amount of charged, power of the high-voltage battery 622 is lacking or when the engine 610 is not sufficiently warmed, the engine 610 keeps being driven without being stopped. Further, in the idle stop mode, a drive source of accessories using the engine 610 as a drive source, such as a compressor of an air conditioner, needs to be maintained. In this case, the motor 300 is driven to drive the accessories.

Also in the acceleration mode or high-load, operation mode, the motor 300 is driven to assist the driving of the engine 610. Inversely, in a charge mode in which the high-voltage battery 622 needs to be charged, the engine 610 causes the motor 300 to generate power to charge the high-voltage battery 622. In other words, the motor 300 performs a regenerative operation when braking or decelerating of the electric vehicle 600.

The electric vehicle 600 includes the inverter device 100 for generating a PWM pulse for converting DC voltage into AC voltage based on a motor output request and converting DC voltage into AC voltage using the generated PWM pulse to drive the motor and the DC/DC converter 624 for increasing the DC voltage. The inverter device 100 generates PWM pulses by changing either the time interval between the centers of ON pulses or the time interval between the centers of OFF pulses of a plurality of PWM pulses based on the output voltage of the DC/DC converter in an angular section where linear approximation is performed around the zero cross point of the output voltage.

The electric vehicle using an inverter drive device according to the present invention changes the time interval of the centers of ON pulses or the time interval of the centers of OFF pulses of the PWM pulses in an angular section (corresponding to θa to θb in FIGS. 3(A) and 3(B)) where linear approximation is performed around the zero cross point of the inverter output voltage (corresponding to θc in FIGS. 3(A) and 3(B)) according to the output voltage of the DC/DC converter 624 that controls DC voltage, and this enables to stably perform the control that increases an output range of the inverter device 100 by adjusting the output voltage of the DC/DC converter 624 of the electric vehicle 600.

The above described inverter device according to the present invention achieves advantageous effects as follows.

(1) An inverter device 100 according to the present invention includes a PWM pulse generator 140 for generating a PWM pulse for converting DC voltage into AC voltage based on a motor output request, and an inverter circuit 110 for driving a motor 300 by converting DC voltage into AC voltage using the PWM pulse generated by the PWM pulse generator 140. The PWM pulse generator 140 is configured to generate a PWM pulse by changing either a time interval between centers of ON pulses or a time interval between centers of OFF pulses of a plurality of PWM pulses, based on a motor output request, in an angular section where linear approximation is performed around a zero cross point of output voltage. In other words, in the linear approximation section, it is made to generate PWM pulses so as to average positive side and negative side output voltages. With this, the size and phase errors of output voltage generated based on the operation state of the inverter device 100 can be canceled.

(2) An inverter device 100 according to the present invention includes a PWM pulse generator 140 for generating a PWM pulse for converting DC voltage into AC voltage based on a motor output request, and an inverter circuit 110 for driving a motor 300 by converting DC voltage into AC voltage using the PWM pulse generated by the PWM pulse generator 140. The PWM pulse generator 140 is configured to generate the PWM pulse so that the time interval between the centers of ON pulses and the time interval between the centers of OFF pulses of a plurality of PWM pulses differ, based on the motor output request, in an angular section where linear approximation is performed around a zero cross point of output voltage. In other words, even when switching frequency of the inverter circuit varies according to the motor output request, voltage pulse timing error of the inverter output voltage can be canceled without changing the PWM carrier cycle caused by an operation state of the inverter device 100.

(3) In an inverter device 100 according to the present invention, angular sections θa to θb are made to be sections that include a range of ±30 degree at least in an electric angle based on a zero cross point θc of output voltage. Since this configuration makes linear approximation of modulated wave easier, the control program can be easily composed.

(4) In an inverter device 100 according to the present invention, a PWM pulse generator 140 is configured to generate a PWM pulse so that a motor 300 is driven at predetermined torque and predetermined rotational rate according to a motor output request. With this configuration, a stable inverter output can be obtained regardless of an operation state of the inverter-device 100.

(5) In an inverter device 100 according to the present invention, the PWM pulse generator 140 is configured to calculate an inclination A of a modulated wave H(θ')=A−θ' in angular sections θa to θb including a range of an electric angle ±30 degree based on a zero cross point θc of output voltage and generate a PWM pulse based on the calculated inclination A. With this configuration, a desirable PWM pulse shift timing near the zero cross point θc can be easily obtained by calculation.

(6) In an inverter device 100 according to the present invention, the PWM pulse generator 140 includes a table in which an inclination A of a modulated wave H(θ')=A−θ' and a PWM pulse are associated and generates a PWM pulse by referring to the table based on the calculated inclination A of the modulated wave H(θ')=A−θ'. Since this configuration enables to linearize an overmodulation area where output from the inverter device 100 is saturated, the control operation can be stabilized.

(7) In an inverter device 100 according to the present invention, a PWM pulse generator 140 is configured to generate a PWM pulse so that the values of integrated areas of ON pulses and OFF pulses of a plurality of PWM pulses becomes equal to in angular sections θa to θb where linear approximation is performed around a zero cross point θc of output voltage. Accordingly, the rotation of the motor 300 can be stabilized.

(8) An electric vehicle 600 according to the present invention includes an inverter device 100 including a PWM pulse generator 140 for generating a PWM pulse for converting DC voltage into AC voltage based on a motor output request, and an inverter circuit 110 for driving a motor 300 by converting DC voltage into AC voltage using the PWM pulse generated by the PWM pulse generator 140, and a DC/DC converter 624 for increasing a level of DC voltage. The PWM pulse generator 140 is configured to generate the PWM pulse by changing either a time interval between centers of ON pulses or a time interval between centers of OFF pulses of a plurality of PWM pulses based on output voltage of the DC/DC converter 624 in angular sections θa to θb where linear approximation is performed around a zero cross point θc of output voltage. With this configuration, by adjusting the output voltage of the DC/DC converter 624 in the electric vehicle 600, control for increasing the output range of the inverter device 100 can be executed in a stable manner.

The electric vehicle 600 according to the embodiment has been described using an example of a hybrid vehicle; however, similar effects can be obtained in a case of a plug-in hybrid vehicle, a battery electric vehicle, and the like.

Further, the above described embodiment has been described the inverter device as a single unit; however, as long as it includes the above described functions, the present invention can be applied to a motor drive system in which an inverter device and a motor are integrated.

It is noted that the present invention is not limited by the above described embodiment and various modification can be applied within the scope of the present invention.

REFERENCE SIGNS LIST 100 inverter device
120 current control unit
160 current detection unit
110 inverter circuit
130 rotational position detection unit
200 battery
500 motor device
300 motor
320 rotational position sensor
600 electric vehicle

The invention claimed is:
1. An inverter device comprising:
   a PWM pulse generation unit configured to generate a PWM pulse for converting DC voltage into AC voltage based on a motor output request; and an inverter circuit configured to drive a motor by converting DC voltage into AC voltage using the PWM pulse generated by the PWM pulse generation unit, wherein
the PWM pulse generation unit generates the PWM pulse by changing either a time interval between centers of ON pulses or a time interval between centers of OFF pulses of a plurality of PWM pulses, based on the motor output request, in an angular section where linear approximation is performed around a zero cross point of output voltage, and
the angular section is a section including a range of at least ±30 degrees of an electric angle based on the zero cross point of the output voltage.

2. The inverter device according to claim 1, wherein the PWM pulse generation unit generates the PWM pulse so that the motor is driven at predetermined torque and predetermined rotational rate according to the motor output request.

3. The inverter device according to claim 1, wherein the PWM pulse generation unit calculates an inclination of a modulated wave in a section including at least a range of ±30 degrees of electric angle based on the zero cross point of the output voltage and generates the PWM pulse based on the calculated inclination.

4. The inverter device according to claim 3, wherein the PWM pulse generation unit includes a table in which the inclination of the modulated wave and the PWM pulse are associated with each other and generates the PWM pulse by referring to the table based on the inclination of the modulated wave.

5. The inverter device according to claim 1, wherein the PWM pulse generation unit calculates the PWM pulse so that values of integrated areas of the ON pulses and OFF pulses of the plurality of PWM pulses become equal in the angular section where linear approximation is performed around the zero cross point of the output voltage.

6. An electric vehicle comprising:
a PWM pulse generation unit configured to generate a PWM pulse for converting DC voltage into AC voltage according to a motor output request;
an inverter circuit configured to drive a motor by converting DC voltage into AC voltage using the PWM pulse generated by the PWM pulse generation unit; and
a DC/DC converter configured to increase the DC voltage,
wherein the PWM pulse generation unit generates the PWM pulse by changing either a time interval between centers of ON pulses or a time interval between centers of OFF pulses of a plurality of PWM pulses, based on output voltage of the DC/DC converter, in an angular section where linear approximation is performed around a zero cross point of the output voltage.

* * * * *